United States Patent [19]

Krenkel et al.

[11] Patent Number: 4,859,396

[45] Date of Patent: Aug. 22, 1989

[54] PROCESS OF PRODUCING TENSION-PROOF, IMPERMEABLE, FLEXIBLE BANDS, IN PARTICULAR FOR PRESSES TO DEWATER FIBER MATERIAL WEBS

[75] Inventors: Bernhard Krenkel; Heinz Joos, both of Heidenheim, Fed. Rep. of Germany

[73] Assignee: F. Oberdorfer GmbH & Co. KG Industriegewebe-Technik, Heidenheim, Fed. Rep. of Germany

[21] Appl. No.: 153,152

[22] Filed: Feb. 8, 1988

Related U.S. Application Data

[63] Continuation-in-part of Ser. No. 823,138, Jan. 28, 1986, abandoned.

[30] Foreign Application Priority Data

May 25, 1983 [DE] Fed. Rep. of Germany ....... 3318984

[51] Int. Cl.$^4$ ................................................. B28B 1/20
[52] U.S. Cl. ..................................... 264/311; 156/74; 156/242; 156/245; 156/246; 156/307.3; 156/307.7; 264/310; 264/312; 427/240

[58] Field of Search ............ 156/195, 160, 165, 137.8, 156/307.3, 307.7, 242, 245, 246, 74, 194, 198, 278; 264/134, 137, 257, 311–312, 320, 270, 273, 310; 427/240, 245; 118/321; 220/414

[56] References Cited

U.S. PATENT DOCUMENTS

| | | | |
|---|---|---|---|
| 3,261,335 | 9/1973 | Cichoski | 156/195 |
| 3,803,281 | 4/1974 | Fix | 264/311 |
| 3,999,507 | 12/1976 | Voermans | 118/321 |
| 4,372,800 | 2/1983 | O/umi | 156/307.3 |

Primary Examiner—Merrell C. Cashion, Jr.
Attorney, Agent, or Firm—Kalish & Gilster

[57] ABSTRACT

The production of tension-proof, liquid impermeable, flexible bands which are preferably utilized for presses to dewater fiber material webs and are subjected therein to substantial tensile stresses between a press-shoe and a press-roll as the same glide across the press-shoe which is effected by means of penetration of a flowable mixture of a prepolymer with a cross linking agent onto the reinforcing band, preferably formed of fabric and receiving the tension forces in a direction longitudinally of the press band. Penetration most effectively occurs through covering the fabric band by pouring thereover of the flowable mixture as the band is in stretched condition and is moved.

4 Claims, No Drawings

PROCESS OF PRODUCING TENSION-PROOF, IMPERMEABLE, FLEXIBLE BANDS, IN PARTICULAR FOR PRESSES TO DEWATER FIBER MATERIAL WEBS

This application is a continuation-in-part of application Ser. No. 823,138 filed Jan. 28, 1986, now abandoned.

BACKGROUND AND SUMMARY OF THE INVENTION

This invention relates to tension-proof, impermeable, flexible bands which include at least one reinforcing band for acceptance of forces developed by tension and, more particularly, to a process for producing same.

The prior art underlying the invention was the manufacture of band by melting and calandering or PUR or spreading of liquid PUR, respectively. Those bands, however, must be provided within the web with a multifilament as a filling weft thread in order to avoid the penetration of the liquid PUR to the other side of the web and insofar to secure a precise spreading of the material on the surface of the web.

The band of the present invention embodies as a reinforcing band a fabric band which is permeated with a polymer such that the same is caused to develop a solid web on the fabric band and which web is in taut condition and caused to permeate the fabric band either by subjection to heating above its melting point so as to flow into the fabric band, or by a wiping-in or rolling-in of the heated polymer by means of a wiper blade or counter roller.

In the present process, wiping is not disregarded so that openings in the band may occur at least in a situation where the surface of the band is substantially ground smooth, through which openings a liquid, such as, for example, lubricating fluid, can flow from one side of the band to the other and, hence, permeate same under the application of pressure.

Therefore, it is an object of the present invention to provide a process for producing a flexible band of the type above indicated whereby a fluid impervious band is reliably obtained in a facil manner.

It is another object of the present invention to provide a process of the character stated whereby a flexible band embodying at least one reinforcing band is obtained by the utilization of readily available constituents and wherein the conditions for effecting the inter-reaction of the same may be accomplished in an economical manner.

DESCRIPTION OF THE INVENTION

According to the present invention, the production of the flexible band having the characteristics referred to hereinabove is achieved by stretching the reinforcing band onto a horizontally positioned cylinder, pouring a flowing mixture of liquid polyurethane prepolymer and a cross linking agent onto said reinforcing band in a stream at a temperature of approximately 20° C. to approximately 150° C. for impregnating said reinforcing band therewith whilst gradually shifting the pouring equipment for the said stream parallel to the longitudinal axis of said cylinder so that constant directional change of gravity relative to the reinforcing band during rotation of said cylinder causes complete envelopment and penetration of the reinforcing band, wherein the thickness of the raw coating being within the range of approximately 5 to approximately 7 mm.

The advantage of the process according to the invention is surprisingly based on the fact that the free flowing mixture of liquid PUR and a cross linking agent onto the band is made at a temperature range between approximately 20° C. and 150° C. and that the thickness of the raw coating is within the range of approximately 5 mm to approximately 7 mm, as only under those conditions cracks within the deformable PUR at the beginning of the process which lead to a destruction of the coating are avoided. This fact was not at all obvious from known processes because it was assumed that the web of PUR if transported over two rolls in a fresh poured and not hardened condition is subjected to shearing forces, decreasing the quality of the final product. Thus, it was completely surprising to see that if the process of the invention is conducted under the conditions as claimed, especially with respect to the temperature and the thickness of the coating, such shearing forces do not harm the qualities of the final product.

Thickness outside of the approximately 5 mm to approximately 7 mm range have not proved to be satisfactory, such as the fact that at below approximately 5 mm the lack of sufficient strength is most apparent whereas, as it were above approximately 7 mm difficulties occur on reverting the band from outside to inside.

Thus the above mentioned particular range of thickness is indeed critical as it delivers optimum properties of those bands with respect to strength and durability especially of the coating as well as with respect to the use of those bands in practice. In this connection we would like to draw attention expressively to the fact that such bands are in general tension-proof, impermeable flexible reinforcing bands provided with dewatering channels which are positioned on the inside surface of such a band which is configured as a cylinder when leaving the manufacturing equipment. Accordingly, it is necessary to reverse the band after removal from the centrifugal tube or casting mold so that the structured surface, i.e., the surface provided with cavities and channels, becomes the outer surface of the band while the smooth surface becomes the inside surface thereof. After reversal such a band may be used in a dewatering press. And that is why the thickness of the coating is so important. And it was found out that the indicated range from approximately 5 mm to approximately 7 mm is the most effective one with respect to the above properties of those bands inclusive the necessary reversal.

It could not be expected that such a range would be critical until after a lot of experimentation resulting in the knowledge that if the range of approximately 5 mm to approximately 7 mm of the coating is not maintained the bands do not possess the properties which are needed for the widespread acceptance.

As it is well known, prepolymers are adducts or reaction intermediates of a polyol and a monomeric osicyanate, in which either component is in considerable excess of the other. Prepolymers are of medium molecular weight and have reactive hydroxyl and —NCO groups. Thus, prepolymers are linear preliminary polymerization stages of diols and diisocyanates which, thus, include terminal isocyanate groups and serve, for example, for producing polyurethane elastomers.

The mixtures of a prepolymer and a compatible cross linking agent, the character of which is within the knowledge of one having ordinary skill in the art, may, depending upon the required technological values of the fabric coating, be of varying proportions. By varying the proportionalities, the particularly desired characteristics of the bands may be obtained, such as, the degree of flexibility, relative thickness or thinness of the band, and the extent of elasticity transversely to their square dimensions. The temperature employed during the reaction of the prepolymer and the cross linking agent also contributes, understandably, to the development of the degree of cross linking and, hence, with expected effect upon the properties of the band. The temperature for cross linking should be within the range of approximately 20° C. to approximately 150° C.

The configuration of the reinforcing band is also a contributing factor to the ultimate strength and mechanical behaviour of the band. Such reinforcing band may, therefore, according to the present invention, be a single-layer, or a multi-layer fabric of filaments of different materials, such as, polyamides, polyester, KEVLAR*, or metal, or combinations of the same.

* KEVLAR is a trademark of E. I. DuPont de Nemours & Co. for an aromatic polyamide fiber of extremely high tensile strength and greater resistance to elongation than steel.

Due to the fact that the tension-proof, impermeable and flexible bands are in continuous form for presses to dewater fiber webs, the reinforcing band, preferably a fabric band, is rendered continuous which occurs through seam-formation in well known manner as in the case of open-woven bands. Another kind of production in accordance with the invention comprises securing the reinforcing band to the inside wall of a cylinder, effecting rapid rotation of said cylinder, pouring a flowing mixture of liquid polyurethane prepolymer and a cross linking agent onto said reinforcing band in a stream at a temperature of approximately 20° C. to approximately 150° C. for impregnating said reinforcing band therewith whilst gradually shifting to the longitudinal axis of said cylinder so that constant directional change of gravity relative to the reinforcing band during rotation of said cylinder causes complete envelopment and penetration of the reinforcing band, wherein the thickness of the raw coating being within the range of approximately 5 mm to approximately 7 mm.

Thereby an uninterrupted coating with at least one smooth face toward the cylinder is obtained, with the regulation of temperature being provided via the cylinder itself.

In order to produce thick bands which are hence of considerable length, another kind of production has been found out to be advantageous, comprising disposing the reinforcing band in a pouring form which is vertically disposed or disposed in an angle of less than 90° to the horizontal, pouring the flowing mixture of liquid polyurethane prepolymer and a cross linking agent onto said reinforcing band in a stream at a temperature of approximately 20° C. to approximately 150° C. to impregnate said reinforcing band therewith.

The present invention also contemplates the utilization of what is designated the polyurethane-application process for producing bands as hereinabove described. In this particular procedure, cold pouring of a readily available polyol and isocyanate may be effected; examples of the same being polyol PU308 and desmodur PU309. This process also permits of the hot pouring of known prepolymers, such as desmodur PU 0137** and baytec 110***. Thus, it is possible, for exemplary and illustrative purposes only, to coat a fabric band having a length as great as 5 meters and a width as much as 10 meters in about one and a half hours under suitable conditions. The grooved surface caused upon coating can be ground after setting of the products subsequent to the prescribed curing time in order to obtain a smooth surface.

** Polyetherpolyolen with additions of tertiary aliphatic amine and primary aromatic diamine.
*** An isocyanate, i.e. a modified 4,4-diisocyanatephenylmethane with NCO-groups as end lins of about 20% monomeric toluoldiisocyanate. Desmodur is a trademark of Farbenfabriken Bayer A.G. for a group of isocyanates and isocyanate prepolymers for urethane coatings, etc.
**** A polyester methylenediisocyanate prepolymer with NCO-groups as end links.
***** An aromatic diamine with reactivity controlled with respect to the NCO-group.

The type of polyurethane pouring systems just described operate, for example, with a coating drum rotating at a speed of about 10 to 15 rpm; with the thickness of the raw coating being within the range of approximately 5 mm to approximately 7 mm, and the thickness of the finished coating being approximately 3 mm.

According to still a further kind of production in accordance with the invention the coating step may also be effected by using two rollers, the diameters of which range from approximately 400 to approximately 600 mm. In this particular case, the procedure is effected with a band speed of approximately 50 meters per minute, and a nozzle advancement for application of the mixed material of from approximately 50 to approximately 100 mm per minute.

With the particular procedure involving coating of the fabric band within a rotating hollow cylinder, as described above, the cylinder diameter is selected according to the band length and is operated with centrifugal speeds up to approximately 600 rpm.

Coated small press bands with great widths having a thickness of the raw coating from approximately 5 mm to 7 mm produced in accordance with the various methods hereinabove described have proved especially serviceable as driving belts in currently used machinery and systems, and also as transport bands in the mining, building, and agricultural fields, as well as particularly in conjunction with dewatering presses.

We claim:

1. A process of producing a fluid impervious flexible coated fabric band including at least one reinforcing band under tension, said at least one reinforcing band being covered at least on one side by an impervious layer penetrating said at least one reinforcing band, comprising stretching the at least one reinforcing band onto a horizontally positioned cylinder, effecing rotation of said cylinder, pouring a flowing mixture of liquid polyurethane prepolymer and a cross linking agent onto said at least one reinforcing band in a stream at a temperature of approximately 20° C. to approximately 150° C. for impregnating said reinforcing band herewith whilst gradually shifting the pouring equipment for the said stream parallel to the longitudinal axis of said cylinder so that constant directional change of gravity relative to the at least one reinforcing band during rotation of said cylinder causes complete envelopment and penetration of the at least one reinforcing band, wherein the thickness of the raw coating being within the range of approximately 5 mm to approximately 7 mm.

2. A process of producing a fluid impervious flexible coated fabric band including at least one reinforcing band under tension, said at least one reinforcing band being covered at least on one side by an impervious layer, penetrating said at least one reinforcing band, comprising securing the at least one reinforcing band to the inside wall of a cylinder, effecting rapid rotation of said cylinder, pouring a flowing mixture of liquid polyurethane prepolymer and a cross linking agent onto said at least one reinforcing band in a stream at a temperature of approximately 20° C. to approximately 150° C. for impregnating said at least one reinforcing band therewith whilst gradually shifting the pouring equipment for the said stream parallel to the longitudinal axis of said cylinder so that constant directional change of gravity relative to the at least one reinforcing band during rotation of said cylinder causes complete envelopment and penetration of the at least one reinforcing band, wherein the thickness of the raw coating being within the range of approximately 5 mm to approximately 7 mm.

3. A process of producing a fluid impervious flexible coated fabric band including at least one reinforcing band under tension, said at least one reinforcing band being covered at least on one side by an impervious layer, penetrating said at least one reinforcing band, comprising guiding the at least one reinforcing band over two rollers, effecting rotation of said rollers, pouring a flowing mixture of liquid polyurethane prepolymer and a cross linking agent onto said at least one reinforcing band in a stream at a temperature of approximately 20° C. to approximately 150° C. for impregnating said at least one reinforcing band therewith whilst gradually shifting the pouring equipment for the said stream parallel to the longitudinal axis of said rollers, so that constant directional change of gravity relative to the at least one reinforcing band during rotation of said rollers, causes complete envelopment and penetration of the at least one reinforcing band, wherein the thickness of the raw coating being within the range of approximately 5 mm to approximately 7 mm.

4. A process of producing a fluid impervious flexible coated fabric band including at least one reinforcing band under tension, said at least one reinforcing band being covered at least on one side by an impervious layer, penetrating into said at least one reinforcing band, comprising disposing the reinforcing band in a pouring form which is vertically disposed or disposed in an angle of less than 90° to the horizontal, pouring the flowing mixture of liquid polyurethane prepolymer and a cross linking agent onto said at least one reinforcing band in a stream at a temperature of approximately 20° C. to approximately 150° C. to impregnate said at least one reinforcing band therewith, so that the thickness of the raw coating being within the range of approximately 5 mm to approximately 7 mm.

* * * * *